US006513559B2

(12) United States Patent
Arakawa

(10) Patent No.: US 6,513,559 B2
(45) Date of Patent: Feb. 4, 2003

(54) PNEUMATIC TIRE WITH SPECIFIED BEAD TOE

(75) Inventor: Jun Arakawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/874,046

(22) Filed: Jun. 6, 2001

(65) Prior Publication Data

US 2001/0054468 A1 Dec. 27, 2001

Related U.S. Application Data

(62) Division of application No. 09/330,219, filed on Jun. 11, 1999, now Pat. No. 6,286,576.

(30) Foreign Application Priority Data

Jun. 17, 1998 (JP) ............................. 10-169712
Jun. 17, 1998 (JP) ............................. 10-169715

(51) Int. Cl.⁷ ...................... B60C 15/00; B60C 15/06; B60C 1/00
(52) U.S. Cl. ................. 152/458; 152/539; 152/543; 152/547
(58) Field of Search ................... 152/458, 539, 152/543, 547

(56) References Cited

U.S. PATENT DOCUMENTS

| 2,937,684 | A | * | 5/1960 | Rockoff ................ 152/458 |
| 3,085,616 | A | * | 4/1963 | Smith et al. ............ 152/458 |
| 3,115,179 | A | * | 12/1963 | Shepherd ............... 152/458 |
| 3,244,214 | A | * | 4/1966 | Bush .................... 152/458 |
| 3,302,681 | A | * | 2/1967 | Travers ............... 152/458 X |
| 5,443,105 | A |   | 8/1995 | Ushikubo et al. |

FOREIGN PATENT DOCUMENTS

JP 02179517 A * 7/1990 ............... 152/543

* cited by examiner

Primary Examiner—Adrienne C. Johnstone
(74) Attorney, Agent, or Firm—Rader, Fishman & Grauer PLLC

(57) ABSTRACT

A pneumatic tire is disclosed, which comprises: (1) a reinforcing rubber layer made of short fiber reinforced rubber, alternatively (2) a reinforcing rubber layer having hardness set in a range of 90° to 99° of JIS-A hardness, which is arranged in an area of a bead section from a bead toe section along a tire inner wall surface, and wherein a chafer composed a non-metallic fiber cord having a high strength and a high elastic modulus is provided to cover an outer side of the reinforcing rubber layer from the tire inner wall surface to the bead toe area.

6 Claims, 4 Drawing Sheets

θ = 60°

H/L₁ = 1.5

L₂/L₁ = 0.5

H/L₁ = 1.5

L₂/L₁ = 0.5

θ = 60°

PNEUMATIC TIRE WITH SPECIFIED BEAD TOE

This is a Continuation Division of application Ser. No. 09/330,219 filed Jun. 11, 1999 now U.S. Pat. 6,286,576. The disclosure of the prior application is hereby incorporated by reference herein in its entirety.

BACKGROUND OF THE INVENTION

The present invention relates to a pneumatic tire having improved turnability during high speed running. More specifically, the invention relates to a pneumatic tire which is suitably used for racing.

With heightened vehicular performance in recent years, further improvement has been demanded for tire turnability during high speed running. Specifically, an excessive lateral force is applied to an outer side of a turning tire when a vehicle is turned during high speed running. A side section and a bead section outside the vehicle fall to the inner side of the tire. Consequently, limitation is put on turnability.

Conventionally, efforts have been made to improve turnability during high speed running by preventing falling of the bead section during turning. For example, a bead section structure was presented (Japanese Unexamined Patent Laid-Open No. 6 (1994)-227216), which uses a bead core made of single strand steel, a rubber stock having hardness set in a range of 80° to 98° of JIS-A hardness and arranged in a bead toe section, and a chafer composed of a non-metallic fiber cord and arranged on an outer surface of the rubber stock.

However, the foregoing bead section structure has been unable to satisfy a recent demand for higher speed driving. For example, it is impossible to secure driving stability when a vehicle is run on a corner of a 100 m radius at a high speed of 200 km/h.

SUMMARY OF THE INVENTION

An object of the present invention is to provide a pneumatic tire capable of securing high speed turnability, for example, when a vehicle is run on a corner of a 100 m radius at a high speed of 200 km/h or higher.

In order to achieve the foregoing object, the present invention provides a pneumatic tire which comprises carcass layers provided between a pair of bead cores, one in a left bead section and the other in a right bead section and a belt layer arranged outside the carcass layers and around a tire in a tread section. A reinforcing rubber layer made of short fiber reinforced rubber is arranged in an area of the bead section from a bead toe section along a tire inner wall surface.

Also, in order to achieve the object, the present invention provides a pneumatic tire comprising carcass layers provided between a pair of bead cores, one in a left bead section and the other in a right bead section and a belt layer arranged outside the carcass layers and around a tire in a tread section. A reinforcing rubber layer having hardness set in a range of 90° to 99° of JIS-A hardness is arranged in an area of the bead section from a bead toe section along a tire inner wall surface. Further, a chafer composed of a non-metallic fiber cord is provided to cover an outer side of the reinforcing rubber layer from the tire inner wall surface to a bead seat, the fiber cord having a strength of at least 0.25 kN/cord and an elastic modulus of at least 20 kN/Mm².

In the pneumatic tire of the present invention, an area of the bead section from the bead toe section to the tire inner wall surface includes (1) a reinforcing rubber layer made of short fiber reinforced rubber, or alternatively (2) a reinforcing rubber layer having hardness set in the range of 90° to 99° of JIS-A hardness. Further, an outer side of the reinforcing rubber layer is covered with a chafer composed of a non-metallic fiber cord from the tire inner wall surface to the bead seat area, the fiber cord having strength of at least 0.25 kNI/cord and an elastic modulus of at least 20 kN/mm². Accordingly, even when a vehicle is turned on a corner of a 100 m radius at a high speed of 200 km/h or higher, since the reinforcing rubber layer of the bead toe section exhibits a high compressive strength to suppress large deformation of the tire side section, turnability can be improved.

BRIEF DESCRIPTION OF THE DRAWINGS

DESCRIPTION OF THE PREFERRED EMBODIMENTS (1) FIG. 1 is a sectional view of a tire meridian direction, showing one side of a bead section which constitutes a pneumatic tire of the present invention used as a racing tire. A pair of bead sections 1 as shown in FIG. 1 are provided in the left and right sides of the tire. Two carcass layers $3_1$ and $3_2$ extend around a bead core 2 which is buried in the bead section 1. An end of the innermost carcass layer $3_1$ is folded around the bead core 2 from a tire inner side to an outer side and wound up. The end part of the innermost carcass layer $3_1$ is then positioned at a level proximate the middle part of a bead filler 8. The outermost carcass layer $3_2$ is arranged along and outside the wound-up part of the carcass layer $3_1$ to reach a tip of a bead toe section 4. In a tread section, a plurality of belt layers (not shown) are arranged outside the carcass layers $3_1$ and $3_2$ and around the tire. Reference numerals $7_1$ and $7_2$ denote reinforcing layers made of organic fiber cords.

Figure 1:
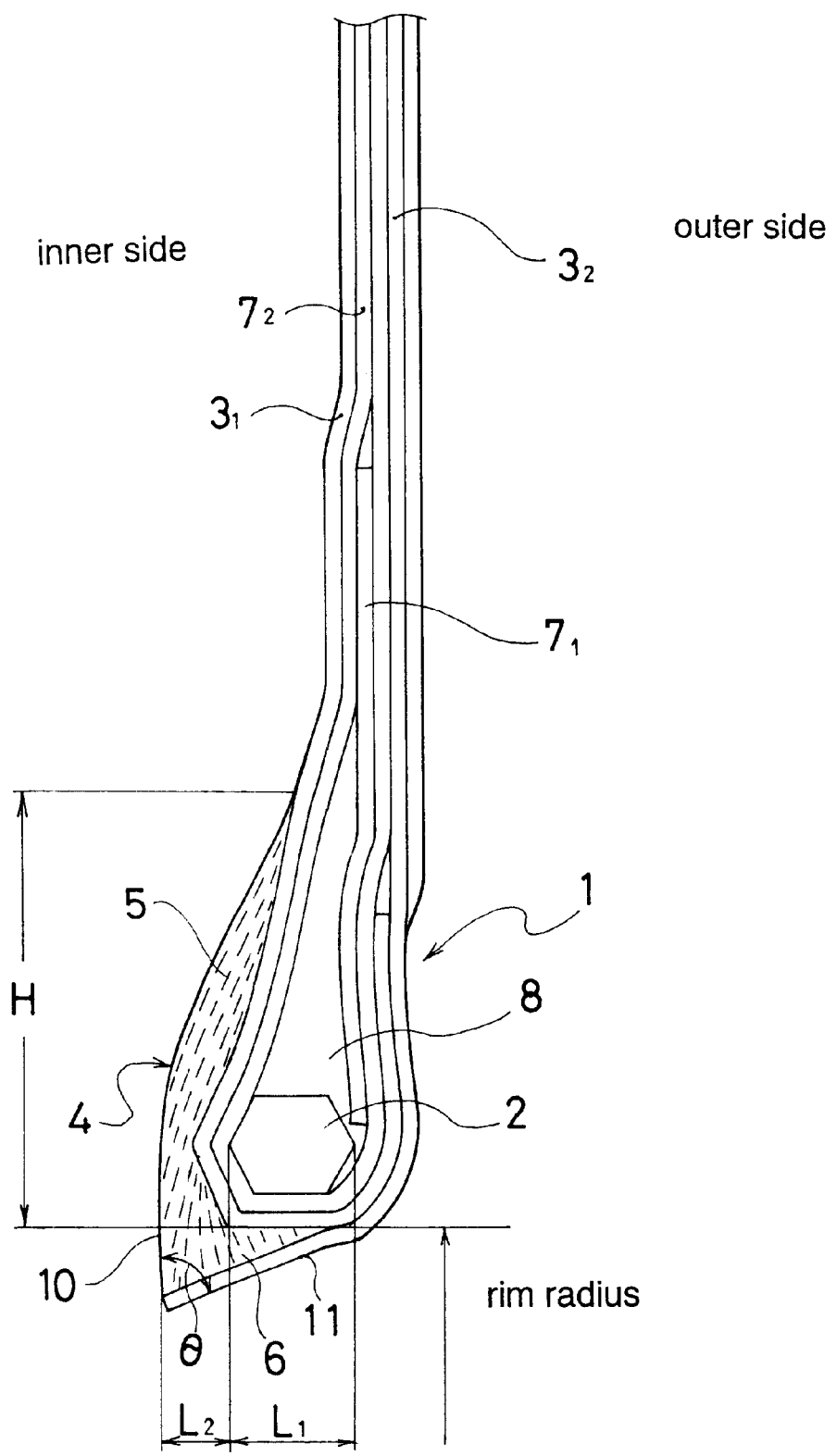
FIG. 1 is a sectional view of a tire meridian direction showing an example of a bead section of a pneumatic tire of the present invention.

The bead toe section 4 includes a reinforcing rubber layer 6, which extends from a tire axial direction inner side area of the bead core 2 along the bead filler 8 to a position near the tip thereof. The reinforcing rubber layer 6 is made of rubber (short fiber reinforced rubber), which is reinforced by short fibers 5.

No particular limitation is put on a kind of a short fiber 5. Any particular type can be used as long as it has reinforcing capability. For example, a short fiber selected from a polyester fiber, a nylon fiber, a vinylon fiber, a carbon fiber, a glass fiber, an aromatic polyamide fiber, and so on, can be used. A length of this short fiber should not be too short or too long. Preferably, the length should be set in a range of 0.2 mm to 6.0 mm. An average diameter of the short fiber 5 should preferably be set equal to 15 $\mu$ or lower.

No particular limitation is placed on a ratio of blending short fibers and rubber for the reinforcing rubber layer 6. Preferably, however, 5 to 30 parts weight of short fibers should be blended with respect to 100 parts weight of rubber. When necessary, compounding agents such as carbon black or the like may be blended. Further, in the reinforcing rubber layer 6, the short fibers should preferably be oriented mainly in a tire radial direction. This orientation can increase a compressive strength of the reinforcing rubber layer 6 and the flexural rigidity thereof. Accordingly, turnability can be improved. Preferably, the hardness of the reinforcing rubber layer 6 should be set in a range of 94° to 99° of JIS-A hardness. An elastic modulus at 20° C. should be set in a range of 50 to 90 MPa.

Regarding a size of the reinforcing rubber layer 6, the following relational expressions should respectively be used as yardsticks for determining $L_2/L_1$ which is a ratio of a tire axial direction width $L_2$ of the reinforcing rubber layer 6 from a bead core innermost side face to a tip of the bead toe section with respect to a tire axial direction maximum width $L_1$ of the bead core 2, an angle $\theta$ which is made by a tire inner wall surface 10 of the tip part of the bead section and a bead seat 11, and $H/L_1$ which is a ratio of a height H (tread direction length) of the reinforcing rubber layer 6 from a rim diameter equivalent position with respect to the maximum width $L_1$.

$0.5 \leq L_2/L_1 \leq 1.0$ $60° \leq \theta \leq 80°$ $1.0 < H/L_1$

If $L_2/L_1$ is lower than 0.5, a width of the reinforcing rubber layer (bead toe section) is too narrow to substantially improve turnability. If $L_2/L_1$ exceeds 1.0, a width of the reinforcing rubber layer (bead toe section) is excessively large which would deteriorate engagement between the bead section and the rim. If an angle $\theta$ is lower than 60°, since a capacity of the reinforcing rubber layer 6 is reduced, a compressive strength of the reinforcing rubber layer 6 is also reduced to make it impossible to improve turnability. If the angle $\theta$ exceeds 80° the capacity of the reinforcing rubber layer 6 is increased so as not to improve turnability. Accordingly, the angle $\theta$ should be in a range of 60° to 80°. If $H/L_1$ is equal to or lower than 1.0, the capacity of the reinforcing rubber layer 6 is reduced to result in a smaller compressive strength of the same. If $H/L_1$ exceeds 2.0. the compressive strength is nearly saturated. Accordingly, $H/L_1$ should be in a range of 1.0 to 2.0.

EXAMPLE 1

We manufactured a tire 1 of the present invention and conventional tires 1 and 2 which all had equal tire sizes of 340/40 ZR13. Then, we examined turnability during high speed running for these tires. Table 1 shows results of the examination.

Tire 1 of the Present Invention

This tire has a bead section structure shown in FIG. 1. The bead core 2 is a bead core made of single strand steel. The reinforcing rubber layer 6 is made of short fiber reinforced rubber which has the following content. The short fiber used is an aromatic polyamide fiber which has an average length of 3.0 mm in a longitudinal direction and an average diameter of about 10 $\mu$. Hardness of the reinforcing rubber layer 6 is equal to 98° of JIS-A hardness, and an elastic modulus at 20° C. is 85 MPa.

Conventional Tire 1

This tire has the same structure as that of the tire 1 of the present invention except not using of short fibers.

Conventional Tire 2

This tire has the same structure as that of the tire 1 of the present invention except for the fact that a rubber stock having hardness equal to 90° of JIS-A hardness is arranged as a reinforcing rubber layer 6 of a bead toe section 4, and a chafer composed of a non-metallic fiber cord is arranged in the outside of this rubber stock.

Turnability During High Speed Running

We carried out turnability tests by counting lap time when a vehicle was run on a test course having one-round length of 4.4 km and a corner of a 100 m radius, and determining passing speeds at the corner of a 100 m radius. An examined vehicle was a 3-litter car specialized for racing. Results of the examination are indicated by indices with an index of the conventional tire 2 set to 100. A larger index value means better turnability.

TABLE 1

|  | Tire 1 of the present invention | Conventional tire 1 | Conventional tire 2 |
| --- | --- | --- | --- |
| Turnability | 110 | 100 | 100 |

It can be understood from Table 1 that the tire 1 of the present invention has better turnability compared with the conventional tires 1 and 2.

Figure 2:
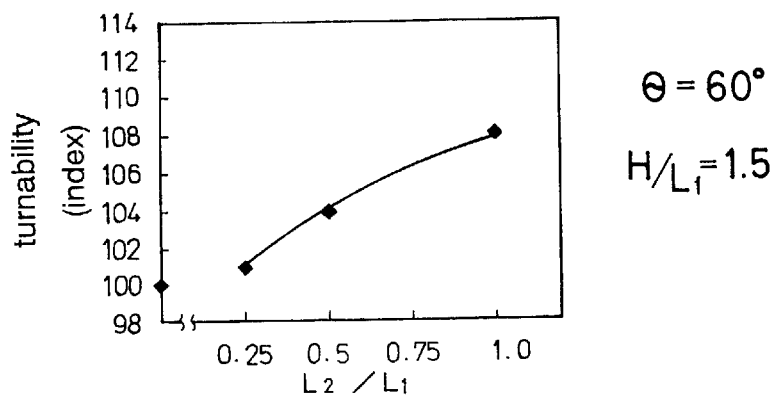
FIG. 2 is a view showing a relationship between a width $L_2/L_1$ and turnability during high speed running.

For the tire 1 of the present invention, we examined turnability during high speed running by setting $\theta$ to 60° and $H/L_1$ to 1.5, and sequentially changing $L_2/L_1$ to 0.25, 0.5, 0.75 and 1.0. A result of the examination is shown in FIG. 2. It should be noted that an index of the convention tire 2 is 100 in FIG. 2.

It can be understood from FIG. 2 that indices of turnability are higher when $L_2/L_1$ is set in the range of 0.5 to 1.0.

Figure 3:
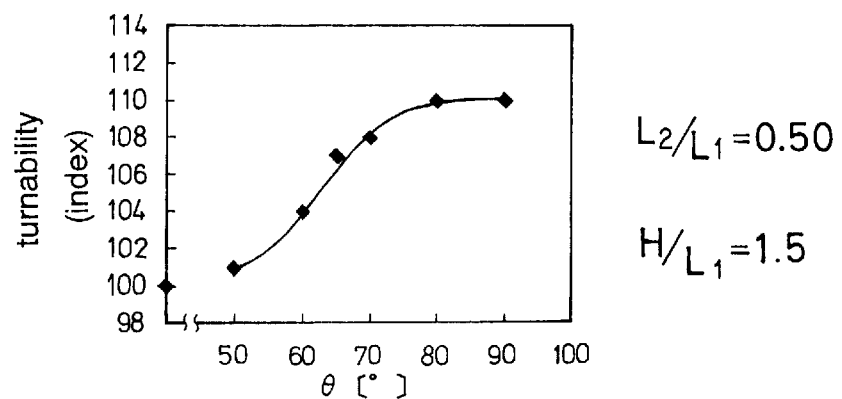
FIG. 3 is a view showing a relationship between an angle $\theta$ and turnability during high speed running.

For the tire 1 of the present invention, we examined turnability during high speed running by setting $L_2/L_1$ to 0.5 and $H/L_1$ to 1.5, and sequentially changing $\theta$ to 50°, 60°, 70°, 80° and 90°. A result of the examination is shown in FIG. 3. It should be noted that an index of the conventional tire 2 is 100 in FIG. 3.

It can be understood from FIG. 3 that indices of turnability are higher when B is set in the range of 60 to 80

Figure 4:
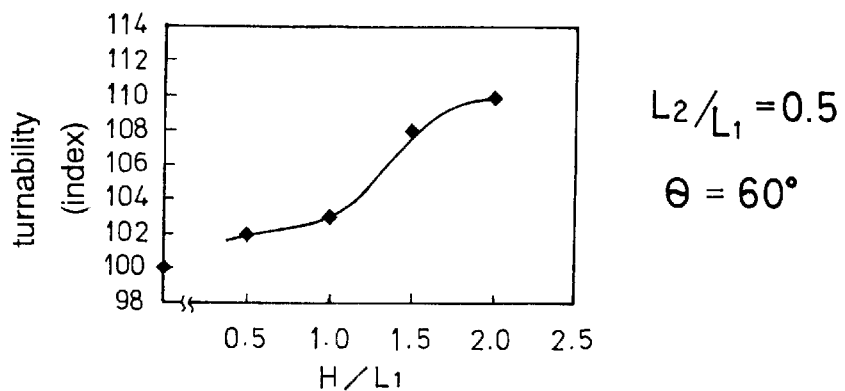
FIG. 4 is a view showing a relationship between a height H/a width $L_1$ and turnability during high speed running.

For the tire 1 of the present invention, we examined turnability during high speed running by setting $L_2/L_1$ to 0.5 and $\theta$ to 60°, and sequentially changing $H/L_1$ to 0.5, 1.0, 1.5 and 2.0. A result of the examination is shown in FIG. 4. It should be noted that an index of the conventional tire 2 is 100 in FIG. 4.

It can be understood from FIG. 4 that indices of turnability are higher in the range of $1.0 < H/L_1$.

Figure 5:
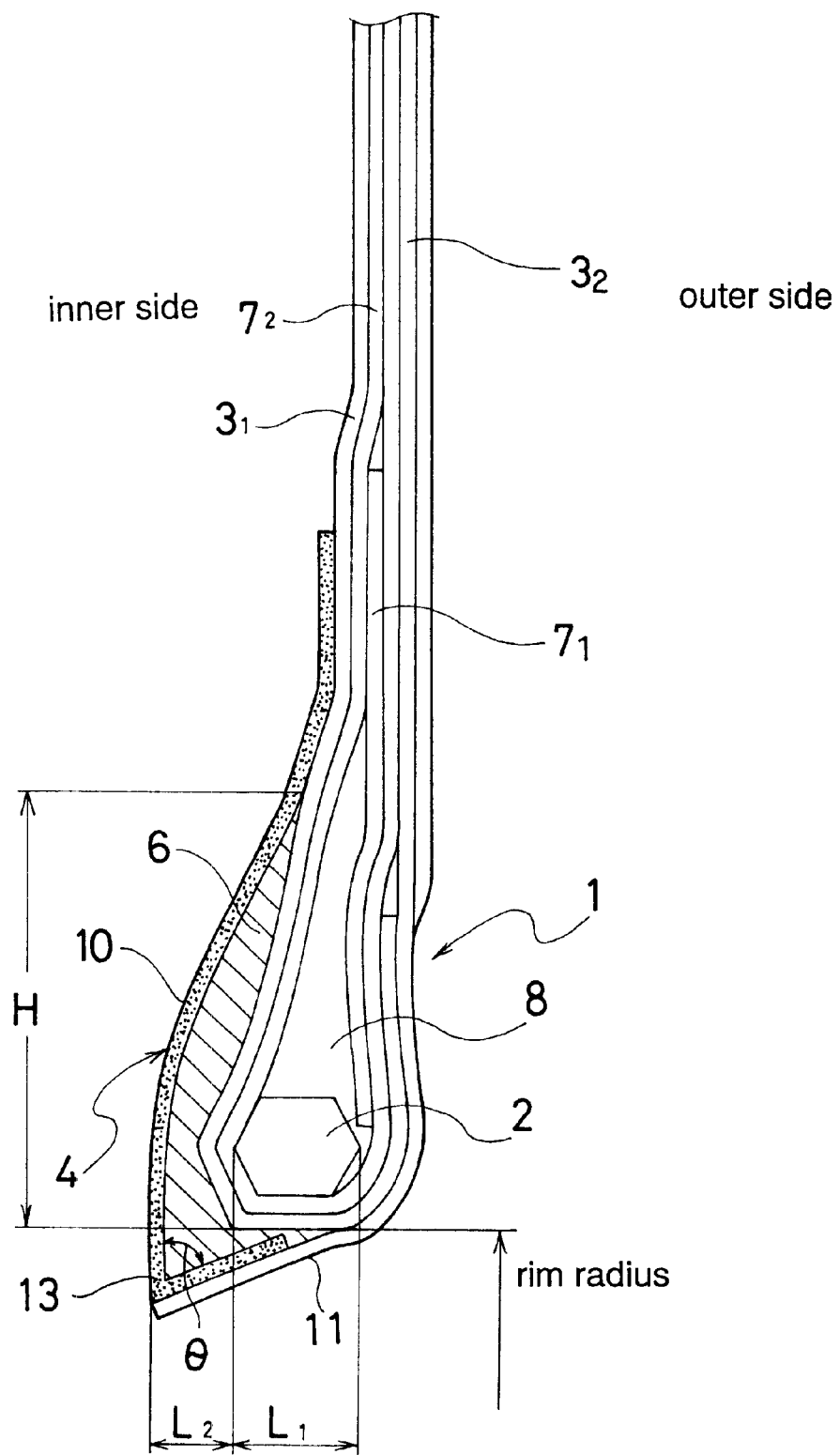
FIG. 5 is a sectional view of a tire meridian direction, showing another example of a bead section of a pneumatic tire of the present invention.

(2) FIG. 5 is a sectional view of a tire meridian direction, showing one side of a bead section of another pneumatic tire of the present invention used as a racing tire. A pair of bead sections 1 as shown in FIG. 5 are provided in the left and right sides of the tire. Two carcass layers $3_1$ and $3_2$ extend around the bead core 2 which is buried in the bead section 1. The end part of the innermost carcass layer $3_1$ is folded around the bead core 2 from the tire inner side to the outer side and wound up. The end part of the innermost carcass layer $3_1$ is then positioned at a level proximate the middle part of the bead filler 8. The outermost carcass layer $3_2$ is arranged along and outside the wound-up part of the carcass layer $3_1$ to reach the tip of the bead toe section 4. In the tread section, a plurality of belt layers (not shown) are arranged outside the carcass layers $3_1$ and $3_2$ and around the tire. Reference numerals $3_1$ and $3_2$ denote reinforcing layers which are made of general organic cords such as nylon fiber cords, polyester fiber cords or the like.

In an area from the bead toe section 4 along a tire inner wall surface, the reinforcing rubber layer 6 having hardness set in a range of 90° to 99° of JIS-A hardness is arranged. If hardness is lower than 90° of JIS-A hardness, the bead toe section 4 is too soft to improve high speed turnability. On the other hand, if hardness exceeds 99° of JIS-A hardness, rigidity of the bead section is excessively high to make it difficult to perform mounting. Consequently, a bead toe cutting or deterioration of seating of the bead section on the rim occurs.

An outer side of a reinforcing rubber layer 6 (including a tire axial direction inner side face and a tire radial direction inner side face of the reinforcing rubber layer 6) is covered with a chafer 13 from a tire inner side wall surface 10 to a bead seat 11. This chafer 13 is composed of a non-metallic fiber cord which has a strength of at least 0.25 kN/cord and an elastic modulus of at least 20 kN/mm$_2$.

This cord is made of, for example, a non-metallic fiber selected from an aromatic polyamide fiber, a carbon fiber, a glass fiber, and so on. Among these fibers, aromatic polyamide fiber should preferably be used for the cord. Such a non-metallic fiber cord should have a thickness of 720d/2 or higher, preferably a thickness set in a range of 1000d/2 to 1500d/2. The number of cords to be driven in (end count) for making the chafer should be 29 pieces/50mm or more, preferably 40 to 60 pieces/50 mm. Further, in the chafer, the fiber cord should preferably be inclined by 20° to 90° in a tire circumferential direction.

Regarding the size of the reinforcing rubber layer 6, the following relational expressions should respectively be used as yardsticks for determining: $L_2/L_1$ which is a ratio of a tire axial direction width $L_2$ of the reinforcing rubber layer 6 from a bead core innermost side face to a tip of the bead toe section with respect to a tire axial direction maximum width $L_1$ of the bead core 2, an angle θ which is made by a tire inner wall surface 10 side of the chafer of the tip part of the bead toe section and a chafer of the bead seat 11 side, and $H/L_1$ which is a ratio of a height H (tread direction length) of the reinforcing rubber layer 6 from a rim diameter equivalent position with respect to the maximum width $L_1$.

$0.5 \leq L_2/L_1 \leq 1.0$
$60° \leq θ$
$1.0 < H/L_1$

If $L_2/L_1$ is lower than 0.5, a width of the reinforcing rubber layer (bead toe section) is too narrow to substantially improve turnability. If $L_2/L_1$ exceeds 1.0, a width of the reinforcing rubber layer (bead toe section) is excessively large which would deteriorate engagement between the bead section and the rim. If an angle θ is lower than 60°, since a capacity of the reinforcing rubber layer 6 is reduced, a compressive strength of the reinforcing rubber layer 6 is also reduced to deteriorate turnability. If an angle θ exceeds 80° a capacity of the reinforcing rubber layer 6 is too large to improve turnability. Accordingly, an angle θ should be in the range of 60° to 80°. If $H/L_1$ is equal to or lower than 1.0, a capacity of the reinforcing rubber layer 6 is reduced to result in a smaller compressive strength of the same. If $H/L_1$ exceeds 2.0, a compressive strength is nearly saturated. Accordingly, $H/L_1$ should be in the range of over 1.0 to 2.0.

EXAMPLE 2

We manufactured a tire 2 of the present invention and a conventional tire 3, which had equal tire size of 340/40 ZR13. For these tires, we examined turnability during high speed running as in the case of the Embodiment 1. Table 2 shows results of the examination.

Tire 2 of the present invention

This tire has a bead section structure shown in FIG. 5. The bead core 2 is a bead core made of single strand steel. The reinforcing rubber layer 6 has a rubber composition of the following content.

Hardness of the reinforcing rubber layer 6 is equal to 91° of JIS-A hardness. A chafer 13 is composed of an aramid fiber cord (aromatic polyamide fiber cord) having a thickness of 1000d/2. An end count is 41 pieces/50mm. An inclination angle of the aramid fiber cord in a tire circumferential direction is 45°. $L_2/L_1$ is 0.5. An angle θ is 60°. $H/L_1$ is 1.

Conventional tire 3

This tire has the same structure as that of the tire 2 of the present invention except not having the chafer 13.

TABLE 2

|  | Tire 2 of the present invention | Conventional tire 3 |
| --- | --- | --- |
| Turnability | 110 | 100 |

It can be understood from Table 2 that the tire 2 of the present invention has better turnability compared with the conventional tire 3.

Figure 6:
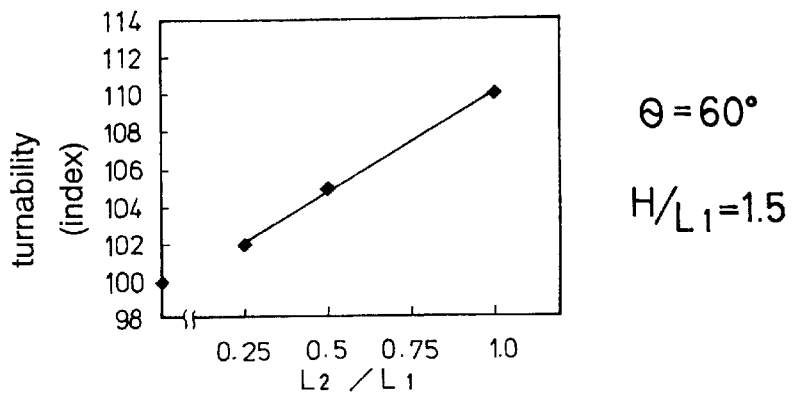
FIG. 6 is a view showing another relationship between a width $L_2/L_1$ and turnability during high speed running.

For the tire 2 of the present invention, we examined turnability during high speed running by setting θ to 60° and $H/L_1$ to 1.5, and sequentially changing $L_2/L_1$ to 0.25, 0.5, 0.75 and 1.0. A result of the examination is shown in FIG. 6. It should be noted that an index of the conventional tire 3 is 100 in FIG. 6.

It can be understood from FIG. 6 that turnability indices are higher when $L_2/L_1$ is set in the range of 0.5 to 1.0.

Figure 7:
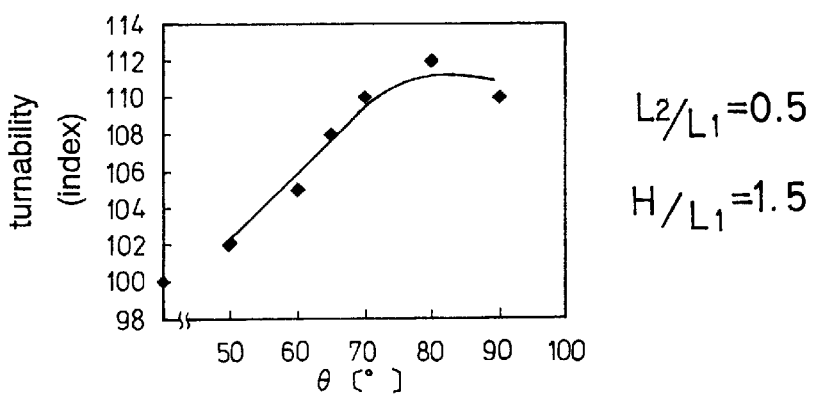
FIG. 7 is a view showing another relationship between an angle $\theta$ and turnability during high speed running.

For the tire 2 of the present invention, we examined turnability during high speed running by setting $L_2/L_1$ to 0.5 and $H/L_1$ to 1.5, and sequentially changing θ to 50°, 60°, 70°, 80° and 90°. A result of the examination is shown in FIG. 7. It should be noted that an index of the conventional tire 3 is 100 in FIG. 7.

It can be understood from FIG. 7 that turnability indices are higher when 8 is set in the range of 60° to 80°.

Figure 8:
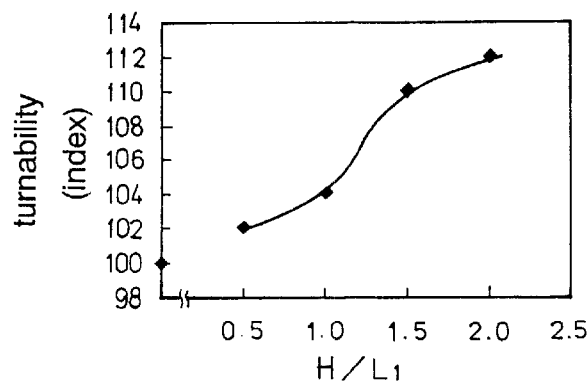
FIG. 8 is a view showing another relationship between a height H/a width $L_1$ and turnability during high speed running.

For the tire 2 of the present invention, we examined turnability during high speed running by setting $L_2/L_1$ to 0.5 and θ to 60°, and sequentially changing $H/L_1$ to 0.5, 1.0, 1.5 and 2.0. A result of the examination is shown in FIG. 8. It should be noted that an index of the conventional tire 3 is 100 in FIG. 8.

It can be understood from FIG. 8 that turnability indices are higher in the range of $1.0 < H/L_1$.

As described above, according to the present invention, the bead section includes (1) the reinforcing rubber layer made of short fiber reinforced rubber, or (2) the reinforcing rubber layer having hardness set in the range of 90° to 99°, which is arranged in the area from the bead toe section along the tire inner wall surface. Also, from the tire inner wall surface to the bead seat area, the outer side of the reinforcing rubber layer is covered with the chafer, which is composed of a non-metallic fiber cord having a strength of at least 0.25 kN/cord and an elastic modulus of at least 20 kN/mm$^2$ (high strength and high elastic modulus organic fiber cord). Therefore, high-speed tunability can be secured, for example, when a vehicle is turned on a corner of a 100 m radius during running at a high speed of 200 km/h or higher.

What is claimed is:

1. A pneumatic tire comprising:

carcass layers provided between a pair of bead cores buried one in a left bead section and the other in a right bead section; and a belt layer arranged outside said carcass layers and around the tire in a tread section;

wherein a reinforcing rubber layer made of short fiber reinforced rubber is arranged in an area of each said bead section from a bead toe section along a tire inner wall surface; and wherein the following relational expressions are respectively used for determining $L_2/L_1$ which is a ratio of a tire axial direction width $L_2$ of said reinforcing rubber layer from a bead core innermost side face to a tip of said bead toe section with respect to a tire axial direction maximum width $L_1$ of said bead core, an angle $\theta$ which is made by a tire inner wall surface side of said tip part of said bead toe section and a bead seat surface side of said tip part of said bead toe section, and $H/L_1$, which is a ratio of a height H of said reinforcing rubber layer from a rim diameter equivalent position with respect to said maximum width $L_1$:

$0.5 \leq L_2/L_1 \leq 1.0$;

$60° \leq \theta \leq 80°$; and $1.0 < H/L_1 \leq 2.0$.

2. A pneumatic tire according to claim 1, wherein a short fiber for said short fiber reinforced rubber is selected from the group consisting of a polyester fiber, a nylon fiber, a vinylon fiber, a carbon fiber, a glass fiber and an aromatic polyamide fiber.

3. A pneumatic tire according to claim 2, wherein a length of said short fiber in a longitudinal direction is set in a range of 0.2 mm to 6.0 mm, and an average diameter of said short fiber is set equal to or lower than 15 $\mu$.

4. A pneumatic tire according to claim 1, wherein a short fiber in said reinforcing rubber layer is mainly oriented in a tire radial direction.

5. A pneumatic tire according to claim 1, wherein hardness of said reinforcing rubber layer is set in a range of 94 to 99 of JIS-A hardness, and an elastic modulus of said reinforcing rubber layer at 20° C. is set in a range of 50 to 90MPa.

6. A pneumatic tire according to claim 1, wherein said reinforcing rubber layer contains 5 to 30 parts weight of short fiber blended with respect to 100 parts weight of rubber.

* * * * *